(12) United States Patent
Tanaka et al.

(10) Patent No.: US 8,184,373 B2
(45) Date of Patent: May 22, 2012

(54) OPTICAL ELEMENT AND METHOD FOR PRODUCING THE SAME

(75) Inventors: Yasuhiro Tanaka, Hyogo (JP); Makoto Umetani, Osaka (JP); Hiroshi Yamaguchi, Osaka (JP); Motonobu Yoshikawa, Osaka (JP); Katsuhiko Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 141 days.

(21) Appl. No.: 11/596,283

(22) PCT Filed: May 9, 2005

(86) PCT No.: PCT/JP2005/008436
§ 371 (c)(1),
(2), (4) Date: Aug. 15, 2007

(87) PCT Pub. No.: WO2005/109042
PCT Pub. Date: Nov. 17, 2005

(65) Prior Publication Data
US 2008/0055728 A1 Mar. 6, 2008

(30) Foreign Application Priority Data
May 12, 2004 (JP) ................................. 2004-142769

(51) Int. Cl.
*G02B 27/10* (2006.01)
(52) U.S. Cl. ........................................................ 359/619
(58) Field of Classification Search .................. 359/350, 359/566–577, 601–615, 619–621, 708, 719
See application file for complete search history.

(56) References Cited

U.S. PATENT DOCUMENTS

| 4,013,465 | A   |   | 3/1977  | Clapham et al. |       |
|-----------|-----|---|---------|----------------|-------|
| 6,359,735 | B1  |   | 3/2002  | Gombert et al. |       |
| 6,473,238 | B1  | * | 10/2002 | Daniell        | 359/622 |
| 6,903,877 | B2  | * | 6/2005  | Tsunetomo      | 359/654 |

(Continued)

FOREIGN PATENT DOCUMENTS

JP    2001-250692    9/2001

(Continued)

OTHER PUBLICATIONS

Japanese Office Action issued in Japanese Patent Application No. JP 2005-800148722, dated Feb. 15, 2008.

(Continued)

*Primary Examiner* — Scott J Sugarman
*Assistant Examiner* — Vipin Patel
(74) *Attorney, Agent, or Firm* — McDermott Will & Emery LLP

(57) ABSTRACT

The present invention relates to a structure comprising: a resin pattern (A)3 formed on a base material 1 and having structure units of a predetermined shape; and a resin pattern (B)5 formed on a surface of the resin pattern (A)3 and having microscopic structure units, of a predetermined shape, arranged at a period shorter than or equal to a wavelength range of a using light, and to a method for producing the structure, comprising the steps of: (i) forming a resin layer 2 on the base material 1 and subjecting the resin layer 2 to an exposure-development process so as to form the resin pattern (A)3; and (ii) subjecting a surface of the resin pattern (A)3 to an exposure-development process so as to form the resin pattern (B)5, wherein the steps (i) and (ii) are sequential.

33 Claims, 6 Drawing Sheets

U.S. PATENT DOCUMENTS

| | | | |
|---|---|---|---|
| 6,950,140 B2 * | 9/2005 | Fukuyoshi et al. | 348/340 |
| 2003/0197906 A1 * | 10/2003 | Furuta et al. | 359/15 |
| 2004/0247010 A1 | 12/2004 | Okada et al. | |
| 2005/0093210 A1 * | 5/2005 | Umetani et al. | 264/528 |

FOREIGN PATENT DOCUMENTS

| | | |
|---|---|---|
| JP | 2002-261261 | 9/2002 |
| JP | 2003-57422 | 2/2003 |
| JP | 2003-240903 | 8/2003 |
| JP | 2003-279706 | 10/2003 |
| WO | WO 2004/031815 A1 | 4/2004 |

OTHER PUBLICATIONS

Japanese Office Action issued in Japanese Patent Application No. 2006-513016, mailed Apr. 17, 2009.

Chinese Office Action, w/ English translation only, issued in Chinese Patent Application No. 2005800148722, dated Feb. 15, 2008.

* cited by examiner (a)

(b)

(c)

(a)

(b)

(c)

(d)

(e)

(f)

(a)

(b)

(c)

(d)

OPTICAL ELEMENT AND METHOD FOR PRODUCING THE SAME

RELATED APPLICATIONS

This application is a national phase of PCT/JP2005/008436 filed on May 9, 2005 which claims priority from Japanese Application No. 2004-142769 filed on May 12, 2004, the disclosures of which Applications are incorporated by reference herein. The benefit of the filing and priority dates of the International and Japanese Applications is respectfully requested.

TECHNICAL FIELD

The present invention relates to a structure, an element and an optical element, together with methods for producing the same. Particularly, the present invention relates to a structure, an element and an optical element, suitable for a member including a micro lens in an image sensor, e.g., a CCD or a C-MOS, a liquid crystal device or the like, and to methods for producing the same.

BACKGROUND ART

Generally, it is necessary that an optical function of an optical element is to be enhanced by, for example, eliminating an unnecessary reflecting light, scattering light or the like, or alternatively, preventing a light from reflecting or scattering thereby efficiently using only an effective light. Various methods have been proposed for such an enhancement of the optical function.

Conventionally, adopted is a method for forming a thin film of $SiO_2$, $TiO_2$ or the like on an optical functional surface of an optical element by using a method such as, for example, vapor deposition, sputtering or coating, so as to prevent an entrance of an unnecessary reflecting light or scattering light. However, a complicated process is required for forming such a thin film, and thereby leading to inefficiency in productivity and hence causing increase in cost. Moreover, such a thin film has a large wavelength dependency, and therefore, an effect of preventing reflection-scattering of a light having a wavelength other than a predetermined wavelength is small. Consequently, over an entire range of visible ray frequently used for an optical element such as an image sensor, an unnecessary reflecting light or scattering light cannot be sufficiently prevented from entering.

As described above, when using, for example, an image sensor, one of critical problems is that an unnecessary reflecting light or scattering light, particularly, a scattering light or a re-reflecting light due to a surface of a micro lens and an inner face of a cover glass, becomes a cause of noise. However, an effective means for solving the problem has not been found.

Further, other than the noise due to the unnecessary reflecting light or scattering light, the following problem is possibly arisen for the image sensor, for example. Though depending on the size of an element or the number of pixels, an area (aperture) attributed for a photo-electric conversion of a light receiving section in an image sensor is usually limited to about 20 to 40% of the entire area. A small aperture leads to reduction insensitivity in the image sensor. Therefore, in order to compensate the sensitivity reduction due to the small aperture, a micro lens for collecting light is generally formed on the light receiving section. A demand for a high definition image sensor whose capability exceeding, e.g., two million pixels, is recently ever increasing. However, the sensitivity reduction due to the decrease in numerical aperture is caused even with the micro lens formed in such a high definition image sensor. Moreover, in such a high definition image sensor also, increase in noise such as a flare or a ghost image due to an unnecessary reflecting light or scattering light is certainly a critical problem in addition to the sensitivity reduction.

In order to solve the problems such as the decrease in numerical aperture and the increase in noise such as a flare or a ghost image, an image sensor such as the following is proposed (see patent document 1).

FIG. 10 shows a schematic structure of a conventionally proposed image sensor. As the schematic cross sectional illustration of FIG. 10 shows, an image sensor 100 includes a main image sensor 80 and a micro lens 90, the main image sensor 80 including photo-electric conversion elements 82, light-shielding sections 83, a planarized layer 84a, color filters 85, a planarized layer 84b and an undercoat layer 86 successively formed on a semiconductor substrate 81, and the micro lens 90 including a resin lens 91 and a porous layer 92 formed on a surface of the resin lens 91, formed on the undercoat layer 86. Here, through subjecting a transparent resin layer which is formed by coating the resin lens 91 with a transparent resin to dry etching, the porous layer 92 is so formed that a void and a thickness of a resin surface thereof is about a quarter of a light wavelength. By forming the porous layer 92 on the resin lens 91, an appearing refractive index at the porous layer 92 is reduced, whereby it is possible to provide an effect of preventing reflection-scattering to the micro lens 90. Accordingly, the problem of the increase in noise such as a flare or a ghost image in an image sensor can be solved to some extent.

[patent document 1] Japanese Laid-Open Patent Publication No. 2002-261261

DISCLOSURE OF THE INVENTION

Problems to be Solved by the Invention

However, in producing an image sensor having a structure illustrated in FIG. 10, for example, the porous layer 92, i.e., a configuration member of the micro lens 90, is formed by coating the resin lens 91 with a transparent resin so as to form a transparent resin layer and then performing dry etching for the transparent resin layer as described above; in other words, it is necessary to perform two processes, i.e., coating with a transparent resin and dry etching. Therefore, a problem of operation inefficiency is caused and thereby increasing cost. Also, although the micro lens 90 provided with the porous layer 92 has an effect of preventing reflection-scattering to some extent, the effect is not at a level meeting the demand for a high definition image sensor, for example. Additionally, sensitivity which is dependent on a numerical aperture is also not at a level satisfying the demand for the high definition image sensor.

The present invention is performed in view of the above situations. An object of the present invention is to provide a structure, and an element and an optical element including the structure, which are suitable for a member including a micro lens in, for example, an image sensor or a liquid crystal device, and by which the conventional problems such as decrease in numerical aperture and increase in noise such as a flare or a ghost image are solved, together with methods for producing them with ease and at a low cost.

Solution to the Problems

The present invention relates to a structure comprising:

a resin pattern (A) formed on a base material and having structure units of a predetermined shape; and a resin pattern (B) formed on a surface of the resin pattern (A) and having microscopic structure units, of a predetermined shape, arranged at a period shorter than or equal to a wavelength range of a using light.

The present invention relates to a method for producing a structure, comprising the steps (i) and (ii) of:

(i) forming a resin layer on a base material and subjecting the resin layer to an exposure-development process so as to form a resin pattern (A) having structure units of a predetermined shape; and (ii) subjecting a surface of the resin pattern (A) to the exposure-development process and forming a resin pattern (B) having microscopic structure units, of a predetermined shape, arranged at a period shorter than or equal to a wavelength range of a using light, wherein the steps (i) and (ii) are sequential.

The present invention relates to a structure-replicating mold produced, by electroforming, from the structure produced by the above method.

The present invention relates to a method for producing a structure, comprising molding by using the above structure-replicating mold.

The present invention relates to an element comprising:

an element body including a substrate;

a section formed on the element body and including a resin pattern (A) having structure units of a predetermined shape; and a section formed on a surface of the section including the resin pattern (A) and including a resin pattern (B) having microscopic structure units, of a predetermined shape, arranged at a period shorter than or equal to a wavelength range of a using light.

The present invention relates to a method for producing an element, comprising the steps (I) and (II) of:

(I) forming a resin layer on an element body including a substrate and subjecting the resin layer to an exposure-development process so as to form a section including a resin pattern (A) having structure units of a predetermined shape; and (II) subjecting a surface of the section including the resin pattern (A) to the exposure-development process and forming a section including a resin pattern (B) having microscopic structure units, of a predetermined shape, arranged at a period shorter than or equal to a wavelength range of a using light, wherein the steps (I) and (II) are sequential.

The present invention relates to an optical element comprising:

an optical element body including a substrate;

a lens section formed on the optical element body and including a resin pattern (A) having structure units, of a convex lens shape, periodically arranged in an array such that positions thereof correspond to photo-electric conversion elements of the optical element body; and a reflection-scattering prevention section formed on a surface of the lens section and including a resin pattern (B) having microscopic concavo-convex structure units, of a predetermined shape, periodically arranged in an array such that a period thereof is shorter than or equal to a wavelength range of a using light.

The present invention relates to a method for producing an optical element, comprising the steps (1) and (2) of:

(1) forming a resin layer on an optical element body including a substrate, subjecting the resin layer to an exposure-development process so as to form a resin pattern (A) having structure units periodically arranged in an array such that positions thereof correspond to photo-electric conversion elements of the optical element body, and then forming a lens section such that the structure units of the resin pattern (A) have a convex lens shape by heat flow shaping; and (2) subjecting a surface of the lens section to the exposure-development process and forming a reflection-scattering prevention section including a resin pattern (B) having microscopic concavo-convex structure units, of a predetermined shape, periodically arranged in an array such that a period thereof is shorter than or equal to a wavelength range of a using light, wherein the steps (1) and (2) are sequential.

EFFECT OF THE INVENTION

The structure, the element and the optical element of the present invention can solve conventional problems such as decrease in numerical aperture and increase in noise such as a flare or a ghost image and realize remarkable enhancement in sensitivity and reduction in noise. Therefore, they are suitable for a member including a micro lens or the like in, for example, an image sensor or a liquid crystal device. Also, according to the methods of the present invention, such excellent structure, element and optical element can be efficiently produced with ease and at a low cost.

Figure 1:
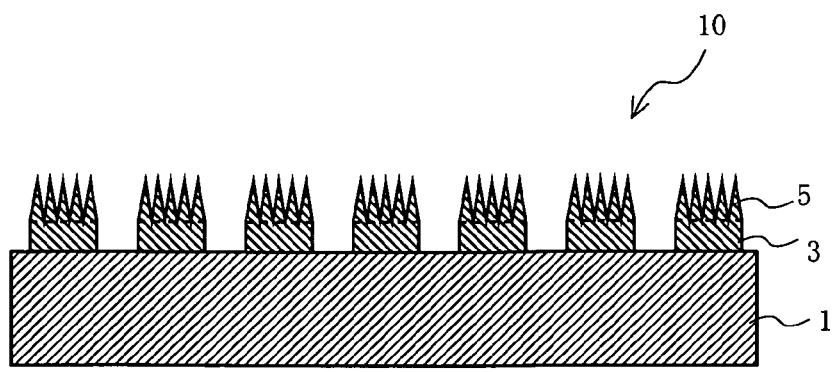
FIG. 1 is a cross sectional illustration schematically showing an example of a structure according to a first embodiment of the present invention.

DESCRIPTION OF THE REFERENCE CHARACTERS 1 base material
1a element body
2 resin layer
3, 3a, 4 resin pattern (A)
5, 6 resin pattern (B)
7, 10 structure
8 electroless nickel-phosphorus plating layer
9 structure-replicating mold
11 element
12 optical element
20 optical element body
21 substrate
22 photo-electric conversion element
23 light-shielding section
24a, 24b planarized layer
25 color filter
26 undercoat layer
200 two-beam interference exposure device

BEST MODE FOR CARRYING OUT THE INVENTION

With reference to the drawings, a structure, an element and an optical element together with methods for producing them are described in more detail in the following.

First Embodiment

A structure of a first embodiment comprises: a resin pattern (A) formed on a base material and having structure units of a predetermined shape; and a resin pattern (B) formed on a surface of the resin pattern (A) and having microscopic structure units, of a predetermined shape, arranged at a period shorter than or equal to a wavelength range of a using light.

In the present embodiment, the wavelength range of the using light corresponds to a wavelength range of a light under an environment where the structure is used. Also, included is a wavelength range of a light under an environment where the structure is produced. Accordingly, depending on a case, the using light corresponds to various light such as a visible ray, an ultraviolet ray or an infrared ray.

FIG. 1 shows a cross sectional illustration schematically showing an example of the structure according to the first embodiment. In a structure 10 shown in FIG. 1, a resin pattern (A) 3 having structure units of a predetermined shape is formed on a surface of a base material 1, and a resin pattern (B) 5 having microscopic structure units of a predetermined shape is formed on a surface of the resin pattern (A) 3.

Figure 2:
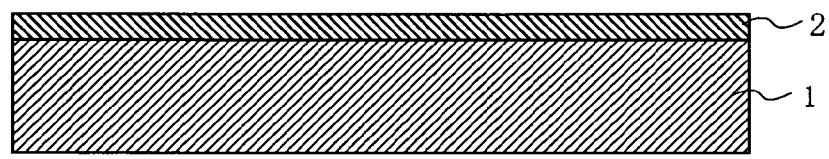
FIGS. 2A to 2C are cross sectional illustrations for schematically showing an example of a method for producing the structure according to the first embodiment of the present invention.
Figure 2:
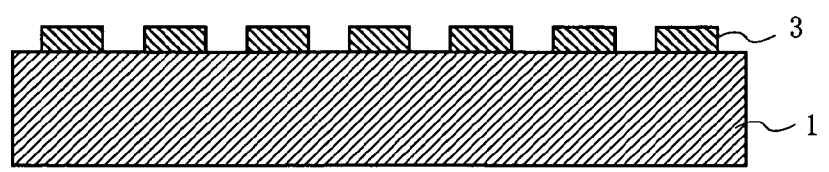
Figure 2:
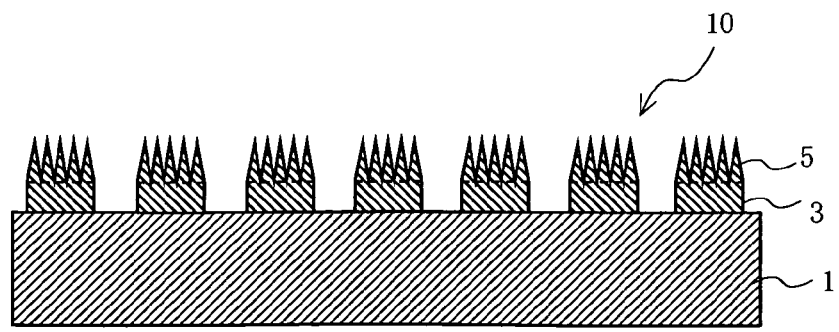

The structure 10 of the first embodiment shown in FIG. 1 can be produced by the following method. FIGS. 2A to 2C show cross sectional illustrations for schematically showing an example of a method for producing the structure according to the first embodiment of the present invention.

A surface of the base material 1 is coated with a resin solution by a spin coat method or the like, and is dried so as to form a resin layer 2 such as shown in FIG. 2A. For the base material 1, a quartz glass base material, a Si-base material, a SiC-base material or the like can be used, for example. When a subsequent exposure-development process to perform for the resin layer 2 is considered, an ultraviolet photoresist or the like which is a photosensitive resin is suitably used as the resin for the resin layer 2. When the photosensitive resin is used, it becomes possible to easily form the resin pattern (B) 5 having microscopic structure units by, for example, a two-beam interference exposure process described later. When it is considered that the structure is used for an optical element such as an image sensor, it is preferable that the resin for the resin layer 2 is excellent in light transitivity. In forming the resin layer 2, in order to enhance its coating applicability or dispersibility, a surface active agent may be added to the resin solution, or two or more kinds of solvents may be mixed with the resin solution. A molecular weight or a molecular weight distribution of the resin may be adjusted, or two or more kinds of resins may be mixed with each other.

The resin layer 2 is subjected to an exposure-development process so as to form the resin pattern (A) 3 having structure units of a predetermined shape shown in FIG. 2B.

In the exposure-development process, conditions for an exposure process or a development process may be appropriately changed according to an aim, i.e., the structure units of the resin pattern (A) 3 to have a predetermined shape. The exposure process in the exposure-development process can be, for example, a mask exposure process in which a photo mask having a desired pattern is formed for exposure, or a two-beam interference exposure process which is used in a two-beam interference exposure device shown in FIG. 9 and is suitable for forming the resin pattern (B) 5 described later. In forming the resin pattern (A) 3, the mask exposure process is preferably employed because a structure unit of the resin pattern (A) 3 is not as quite small as a microscopic structure unit of the resin pattern (B) 5 and relatively various shapes of a structure unit can be formed thereby.

The exposure-development process of the present embodiment at least includes an exposure process and a development process, and includes processes for forming a final target, i.e., the three-dimensional resin pattern (A) or the three-dimensional resin pattern (B).

When it is considered that the structure is used for an optical element such as an image sensor, it is preferable that the structure units of the resin pattern (A) 3 are periodically arranged in an array as shown in FIGS. 1 and 2B. Also, the structure units of the resin pattern (A) 3 are preferably arranged at a period shorter than or equal to 10 µm, or more preferably, shorter than or equal to 8 µm, and are preferably arranged at a period longer than or equal to 1 µm, or more preferably, longer than or equal to 1.5 µm.

A shape for the structure unit of the resin pattern (A) 3 is not particularly limited, and the shape may be appropriately determined according to an intended use of the structure. When, for example, a photo mask having a circular pattern arranged in an array is used, the structure unit of the resin pattern (A) 3 has a cylindrical shape shown in FIGS. 1 and 2B. The structure unit of the resin pattern (A) 3 shown in FIGS. 1 and 2B has the cylindrical shape with a height of 2 µm and a diameter of 4 µm, for example.

When it is considered that the structure is used for an optical element such as an image sensor, it is preferable that the structure unit of the resin pattern (A) 3 has a lens shape, particularly, a convex lens shape. The structure units of a convex lens shape can be formed by heat flow shaping for the resin pattern (A) 3 having structure units of the cylindrical shape shown in FIG. 2B.

The surface of the resin pattern (A) 3 is subjected to the exposure-development process so as to form the resin pattern (B) 5 having microscopic structure units of the predetermined shape shown in FIG. 2C. The microscopic structure units are arranged at a period shorter than or equal to a wavelength range of a using light and, when it is considered that the structure is used for an optical element such as an image sensor, are preferably periodically arranged in an array. From a viewpoint that the resin pattern (A) 3 provides an excellent effect of preventing reflection-scattering, the microscopic structure units are preferably concavo-convex structure units periodically arranged in an array.

In the present embodiment, the effect of preventing reflection-scattering includes not only an effect of completely preventing reflection-scattering of a using light which is to be prevented from reflecting or scattering, but also an effect of preventing reflection-scattering of the using light.

In the exposure-development process, conditions for an exposure process or a development process may be appropriately changed according to an aim, i.e., the microscopic structure units of the resin pattern (B) 5 to have a predetermined shape. As the exposure process in the exposure-development process, the two-beam interference exposure process is, for example, preferably employed since a fine pattern can thereby be simultaneously formed over a wide area and thus, workability is enhanced when the resin pattern (B) 5 having quite small microscopic structure units is formed on the surface of the resin pattern (A) 3. A schematic illustration of a two-beam interference exposure device which can be used for the two-beam interference exposure process is shown in FIG. 9.

Figure 9:
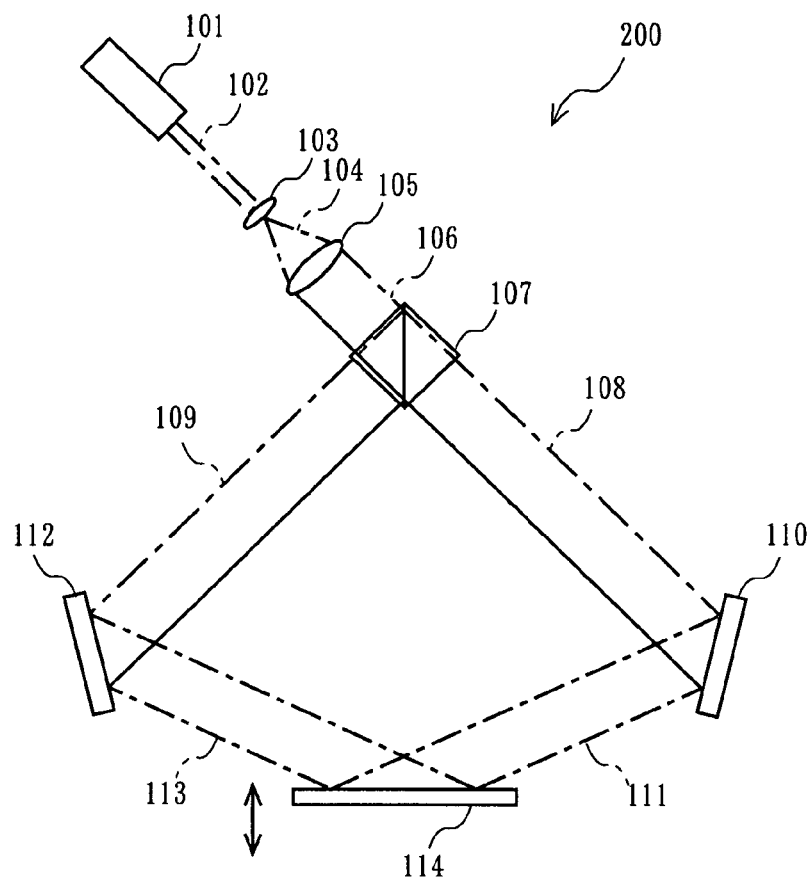
FIG. 9 is a schematic illustration showing a two-beam interference exposure device used for a method of the present invention.
Figure 10:
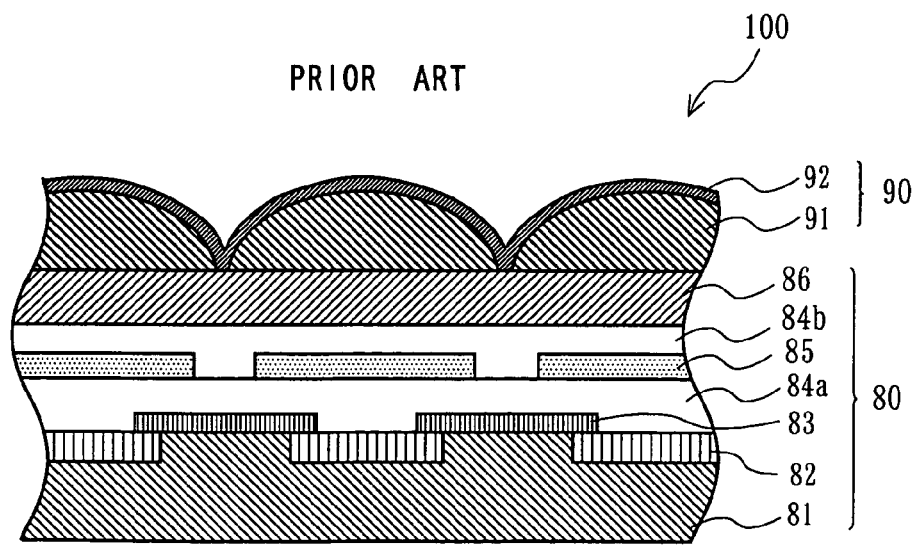
FIG. 10 is a cross sectional illustration schematically showing a structure of a conventional image sensor.

As shown in FIG. 9, a two-beam interference exposure device 200 comprises: a KrF excimer laser (wavelength: 248 nm) 101; a collective lens 103 for spreading a laser beam 102 emitted from the KrF excimer laser 101; a collimating lens 105 for converting a laser beam 104 having been spread by the collective lens 103 into a parallel luminous flux 106; a half mirror 107 for dividing the parallel luminous flux 106 into two parallel luminous fluxes 108 and 109 of equal amplitude; and mirrors 110 and 112 for respectively reflecting the two parallel luminous fluxes 108 and 109 so as to produce two parallel luminous fluxes 111 and 113. Then, the two luminous fluxes (two parallel luminous fluxes 111 and 113) are combined and interference fringes are caused. When the KrF excimer laser having a wavelength of 248 nm is used as in the above, obtaining interference fringes having, for example, a pitch of 0.25 μm requires an opening angle of about 60 degrees between the two luminous fluxes.

In the two-beam interference exposure device 200, the base material 1 (indicated by a numeral 114 in FIG. 9) on which the resin pattern (A) 3 is formed is set at a position where two luminous fluxes (two parallel luminous fluxes 111 and 113) are combined. Then, the KrF excimer laser 101 is caused to emit the laser beam 102 so as to expose the base material 1 (114). A development process or the like is appropriately performed, so as to form on the surface of the resin pattern (A) 3 the resin pattern (B) 5 having microscopic structure units, of the predetermined shape, arranged at a period shorter than or equal to the wavelength range of the using light, as shown in FIG. 2C.

In the two-beam interference exposure process, it is possible that, for example, the base material 1 (114) on which the resin pattern (A) 3 is formed is rotated by 90 degrees so as to be exposed a plurality of times, e.g., twice, respectively, whereby the shape of the microscopic structure unit of the resin pattern (B) 5 can be appropriately changed.

In the two-beam interference exposure device 200 shown in FIG. 9, for example, the base material 1 (114) on which the resin pattern (A)3 is formed can be shifted in a perpendicular direction (up/down direction indicated by an arrow in FIG. 9). By adjusting the position of the base material 1 (114) along the perpendicular direction, the period ("p" in FIGS. 3 and 4 described later) for the microscopic structure units which are concavo-convex structure units and the height ("h" in FIGS. 3 and 4 described later) of a convex portion of the concavo-convex structure unit can be arbitrarily set.

Other than the two-beam interference exposure process, a mask exposure process can be performed as the exposure process in the exposure-development process, for example.

In the mask exposure process, a photo mask of a desired pattern may be formed on the surface of the resin pattern (A) 3 for exposure, for example. Conditions for the mask exposure process may be appropriately changed such that the microscopic structure unit of the resin pattern (B) 5 has the predetermined shape, and desired period and height. After the mask exposure process, a development process or the like is appropriately performed so as to form on the surface of the resin pattern (A) 3 the resin pattern (B) 5 having microscopic structure units of the predetermined shape shown in FIGS. 1 and 2C.

The microscopic structure unit of the resin pattern (B) 5 is preferably a concavo-convex structure unit as described above. Examples thereof are a structure unit of a cone shape shown in the enlarged schematic illustration of FIG. 3, a structure unit of a hexagonal pyramid shape shown in the enlarged schematic illustration of FIG. 4, and the like. Other examples are: a structure unit of a pyramid shape such as a square pyramid shape; a structure unit of a pillar shape such as a cylindrical shape or a prismatic shape; a structure unit of a bell shape having a rounded tip; a structure unit of a frustum shape such as a truncated cone shape or a truncated pyramid shape; and the like. Each structure unit may not be of a strict geometric shape shown in FIGS. 3 and 4.

Figure 3:
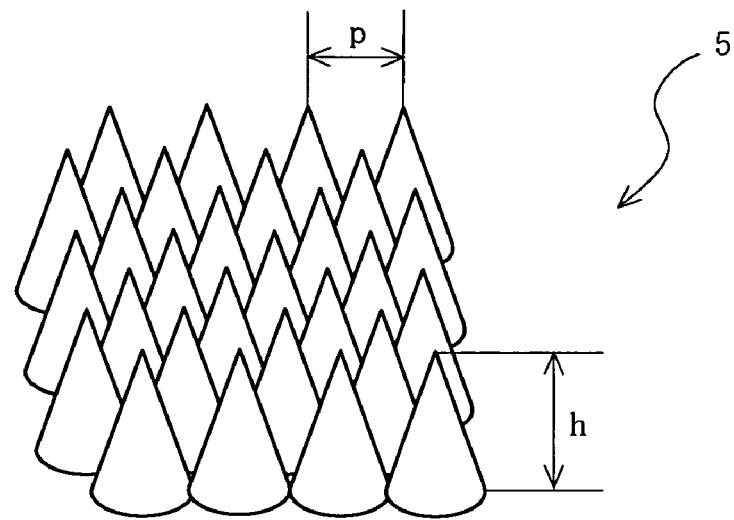
FIG. 3 is an enlarged schematic illustration showing an example of a resin pattern (B) of the present invention.
Figure 4:
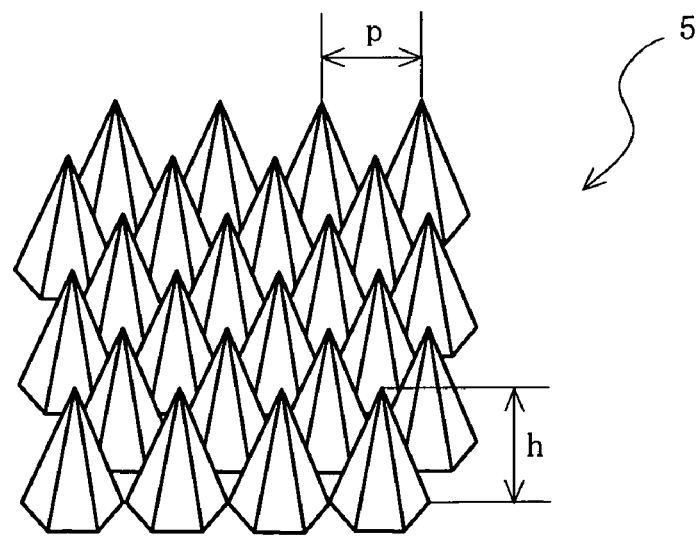
FIG. 4 is an enlarged schematic illustration showing an example of the resin pattern (B) of the present invention.

Further, although FIGS. 3 and 4 show protruding shapes for the microscopic structure units of the resin pattern (B) 5, the present embodiment is not limited to the microscopic structure units of a protruding shape. For example, the resin pattern (B) having microscopic structure units of a recessed shape taking a subulate shape, a pillar shape, a bell shape or a frustum shape may be formed on the surface of the resin pattern (A). Further, a microscopic structure unit of a protruding shape and a microscopic structure unit of a recessed shape may coexist in one resin pattern (B). When using the resin pattern (B) in which a microscopic structure unit of a protruding shape and a microscopic structure unit of a recessed shape coexist, a sum of the height of the protruding portion and the depth of the recessed portion is a height (h) of a convex portion of a concavo-convex structure unit described later. As such, in the present embodiment, the shape of the microscopic structure unit is not particularly limited as long as the resin pattern (B) has microscopic structure units arranged at a period shorter than or equal to a wavelength range of a using light and an effect of preventing reflection-scattering is sufficiently provided.

When the microscopic structure units of the resin pattern (B) are concavo-convex structure units periodically arranged in an array, it is preferable that a relationship between a wavelength (λ) of a using light, a period (p) for the concavo-convex structure units and a height (h) of a convex portion of the concavo-convex structure unit satisfies the following expressions (a) and (b)

$$0.1\lambda < p < 0.8\lambda \quad (a)$$

$$0.5\lambda < h < 5\lambda \quad (b).$$

When the relationship between the wavelength (λ), the period (p) and the height (h) satisfies the above expressions (a) and (b), a reflectance of the using light can be suppressed to smaller than or equal to about 1% in, particularly, an entire wavelength range of visible ray and in a range of 0 to 50 degrees for an incident angle of the using light. It is further preferable that the relationship between the wavelength (λ), the period (p) and the height (h) satisfies the following expressions (a1) and (b1):

$$0.15\lambda < p < 0.75\lambda \quad (a1)$$

$$0.6\lambda < h < 4\lambda \quad (b1)$$

The resin pattern (B) shown in FIGS. 3 and 4 has microscopic structure units of a cone shape (FIG. 3) or a hexagonal pyramid shape (FIG. 4) having a period (p) of about 0.25 μm and a height (h) of about 0.8 μm, for example. The microscopic structure units are arranged at a period shorter than or equal to a wavelength range (420 to 680 nm) in a case of using visible ray as the using light, for example. In the structure 10 shown in FIGS. 1 and 2C, the resin pattern (B) 5 in which microscopic structure units of a cone shape shown in FIG. 3 are periodically arranged in an array is formed on the surface of the resin pattern (A) 3 in which structure units of a cylindrical shape are periodically arranged in an array. By forming the resin pattern (B) 5 having such microscopic structure units on the surface of the resin pattern (A) 3, an excellent effect of preventing reflection-scattering can be provided to the resin pattern (A) 3.

In the present embodiment, when the resin pattern (B) has a large number of microscopic structure units two-dimensionally arranged, the period therefor refers to a period in a direction of the closest arrangement.

Accordingly, it is easy to produce the structure 10 in which the resin pattern (B) 5 having microscopic structure units, of the predetermined shape, arranged at the period shorter than or equal to the wavelength range of the using light is formed on the surface of the resin pattern (A) 3 having structure units, of the predetermined shape, on the face of the base material 1.

The structure of the present embodiment is not limited to the structure 10 having a configuration shown in FIG. 1. Any structure may be used if the resin pattern (A) and the resin pattern (B) described above are included.

The structure of the present embodiment is suitably used as a member of various elements such as: an optical element such as an image sensor, e.g., a CCD or a C-MOS, or a liquid crystal device, that includes a micro lens; and a micro electro mechanical element such as a two-dimensional optical switch, an IR sensor, a membrane sensor, a microgripper or a microknife.

In the present embodiment, an optical element includes all parts, e.g., a lens element, a prism element and a mirror element, arranged in an optical path and having an optical function surface.

Second Embodiment

A structure-replicating mold of a second embodiment is produced, by electroforming, from a structure produced by the method for producing a structure of the first embodiment.

FIGS. 5A to 5F show cross sectional illustrations schematically showing an example of a method for producing the structure-replicating mold of the second embodiment of the present invention. In the method of the present embodiment, all processes and various conditions for forming the resin pattern (B) on a surface of the resin pattern (A) which is on the base material are same as that for the method for producing the structure of the first embodiment.

Figure 5:
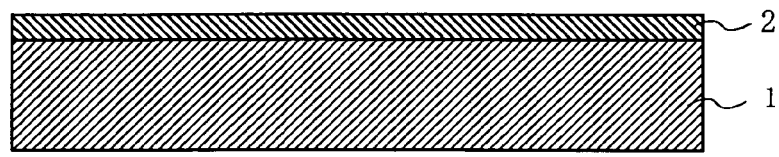
FIGS. 5A to 5F are cross sectional illustrations schematically showing an example of a method for producing a structure-replicating mold according to a second embodiment of the present invention.
Figure 5:
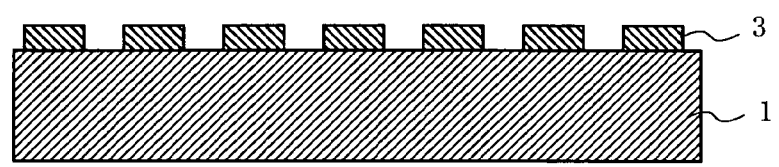
Figure 5:
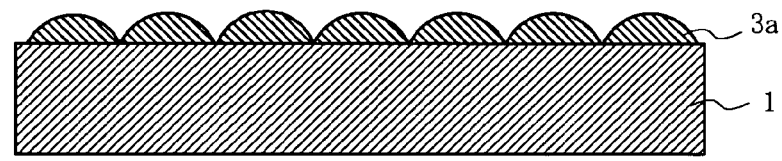
Figure 5:
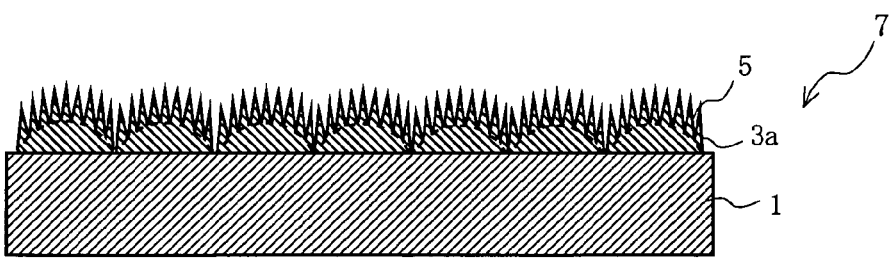
Figure 5:
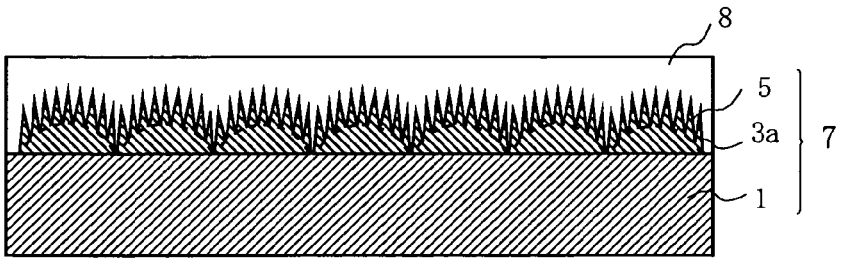
Figure 5:
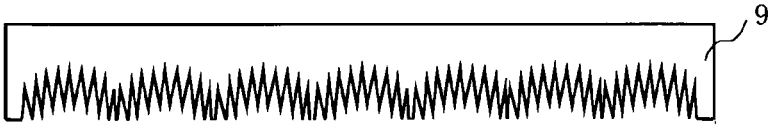

A surface of the base material 1 is coated with a resin solution by a spin coat method or the like, and is dried so as to form the resin layer 2 shown in FIG. 5A. The resin layer 2 is subjected to an exposure-development process so as to form the resin pattern (A) 3 shown in FIG. 5B. The structure unit of the resin pattern (A) 3 shown in FIG. 5B has a cylindrical shape, and by heat flow shaping for the resin pattern (A) 3, a resin pattern (A) 3a having structure units of a convex lens shape shown in FIG. 5C can be formed.

A surface of the resin pattern (A) 3a is subjected to the exposure-development process so as to form the resin pattern (B) 5 having microscopic structure units of a predetermined shape shown in FIG. 5D for producing a structure 7. The microscopic structure units are arranged at a period shorter than or equal to the wavelength range of the using light. From a viewpoint that the resin pattern (A) 3a provides an excellent effect of preventing reflection-scattering, the microscopic structure units are preferably concavo-convex structure units periodically arranged in an array as shown in FIG. 5D.

The surface of the resin pattern (A) 3a having structure units of the convex lens shape is activated with, for example, palladium. Thereafter, as shown in FIG. 5E, the structure 7 is immersed in an electroless nickel-phosphorus plating solution so as to form an electroless nickel-phosphorus plating layer 8 having a thickness of about 8 to 12 nm on the surface of the resin pattern (B) 5 for providing conductivity. Then, with the electroless nickel-phosphorus plating layer 8 being a cathode electrode and a platinum plate being an anode electrode, electroplating is performed until the thickness of a plating portion becomes about 1 to 3 mm in a nickel sulfamate plating solution under a condition where a current density is about 0.5 to 5 A/dm². Hereafter, the structure 7 is removed in a base solution so as to produce a structure-replicating mold 9, i.e., an electroforming mold, shown in FIG. 5F.

The structure of the first embodiment can be produced by molding with the structure-replicating mold. A method for molding is not particularly limited. For example, an injection molding method, a press molding method, a nano imprint method or the like can be adopted as appropriate.

Accordingly, by using the structure-replicating mold 9, it becomes possible to easily produce the structure 7 in which the resin pattern (B) 5 having microscopic structure units, of the predetermined shape, arranged at a period shorter than or equal to the wavelength range of the using light is formed on the surface of the resin pattern (A) 3a having structure units of the predetermined shape on the face of the base material 1.

The structure-replicating mold produced by the method of the present embodiment is not limited to the structure-replicating mold 9 having a configuration shown in FIG. 5F. Any structure-replicating mold may be used if the above described method is employed in produce.

The structure produced by the method of the present embodiment is suitably used as a member of various elements such as: an optical element such as an image sensor, e.g., a CCD or a C-MOS, or a liquid crystal device, that includes a micro lens; and a micro electro mechanical element such as a two-dimensional optical switch, an IR sensor, a membrane sensor, a microgripper or a microknife.

In the present embodiment, an optical element includes all parts, e.g., a lens element, a prism element and a mirror element, arranged in an optical path and having an optical function surface.

Third Embodiment

An element of a third embodiment comprises: an element body including a substrate; a section formed on the element body and including the resin pattern (A) having structure units of a predetermined shape; and a section including the resin pattern (B) formed on the surface of the section including the resin pattern (A), and having microscopic structure units, of a predetermined shape, arranged at a period shorter than or equal to a wavelength range of a using light.

In the present embodiment, the wavelength range of the using light corresponds to a wavelength range of a light under an environment where the element is used. Also, included is a wavelength range of a light under an environment where the element is produced. Accordingly, depending on a case, the using light corresponds to various light such as a visible ray, an ultraviolet ray or an infrared ray.

Figure 6:
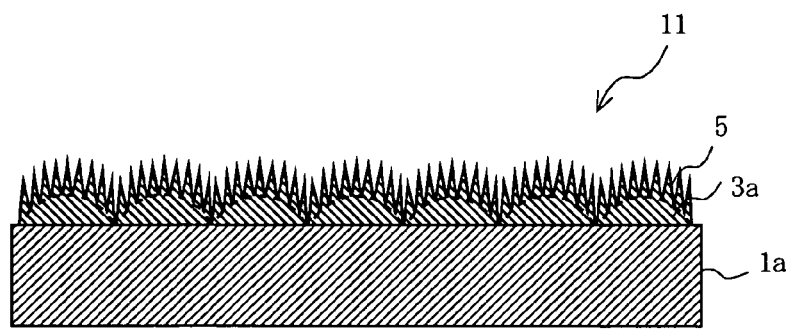
FIG. 6 is a cross sectional illustration schematically showing an example of an element according to a third embodiment of the present invention.

FIG. 6 shows a cross sectional illustration schematically showing an example of the element according to the third embodiment of the present invention. In an element 11 shown in FIG. 6, a section including the resin pattern (A) 3a having structure units of a predetermined shape is formed on an element body 1a including a substrate, and a section including the resin pattern (B) 5 having microscopic structure units of a predetermined shape is formed on a surface of the section including the resin pattern (A) 3a.

The element 11 of the third embodiment shown in FIG. 6 can be produced by the following method. FIGS. 7A to 7D show cross sectional illustrations for schematically showing an example of a method for producing the element of the third embodiment of the present invention.

Figure 7:
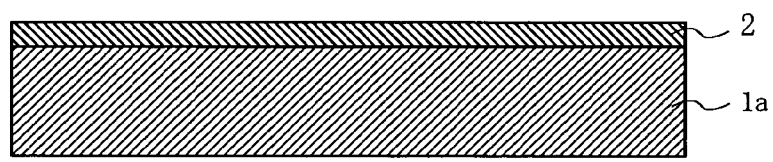
FIGS. 7A to 7D are cross sectional illustrations for schematically showing an example of a method for producing the element according to the third embodiment of the present invention.
Figure 7:
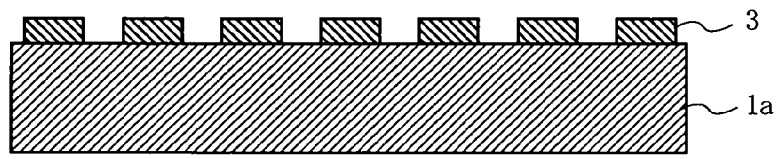
Figure 7:
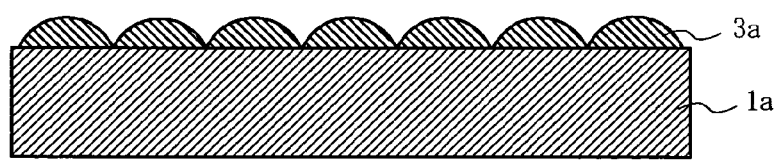
Figure 7:
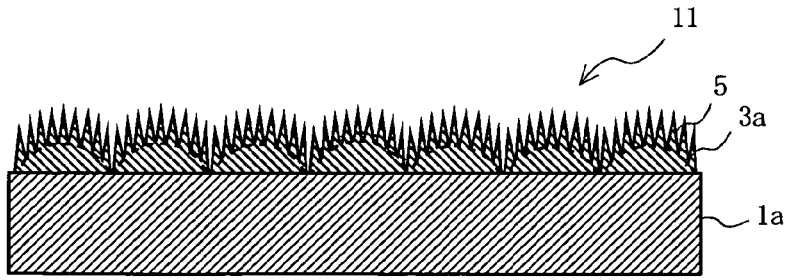

The element body 1a including the substrate is coated with a resin solution by a spin coat method or the like, and is dried so as to form the resin layer 2 shown in FIG. 7A. For the substrate, a quartz glass base material, a Si-base material, a SiC-base material or the like can be used, for example. The element body 1a differs according to kinds of the element and therefore cannot be certainly determined. However, when the element is, for example, an image sensor, used is an element body for which a photo-electric conversion element, a light-shielding section, a color filter and the like are sequentially laminated on the substrate, for example. When a subsequent exposure-development process to perform for the resin layer 2 is considered, an ultraviolet photoresist or the like which is a photosensitive resin is suitably used as the resin to form the resin layer 2. Also, when the photosensitive resin is used, it becomes possible to easily form the section including the resin pattern (B) 5 having microscopic structure units by, for example, a two-beam interference exposure process described later. Further, when it is considered that the element is used for an optical element such as an image sensor, it is preferable that the resin used for the resin layer 2 is excellent in light transitivity. When the resin layer 2 is formed, in order to enhance its coating applicability or dispersibility, a surface active agent may be added to the resin solution, or two or more kinds of solvents may be mixed with the resin solution. A molecular weight or a molecular weight distribution of the resin may be adjusted, or two or more kinds of resins may be mixed with each other.

The resin layer 2 is subjected to an exposure-development process so as to form the section including the resin pattern (A) 3 having structure units of the predetermined shape shown in FIG. 7B.

In the exposure-development process, conditions for an exposure process or a development process may be appropriately changed according to an aim, i.e., the structure units of the resin pattern (A) 3 to have a predetermined shape. The exposure process in the exposure-development process can be, for example, a mask exposure process in which a photo mask having a desired pattern is formed for exposure, or a two-beam interference exposure process which is used in a two-beam interference exposure device shown in FIG. 9 and is suitable for forming the resin pattern (B) 5 described later. In forming the resin pattern (A) 3, the mask exposure process is preferably employed because a structure unit of the resin pattern (A) 3 is not as quite small as a microscopic structure unit of the resin pattern (B) 5 and relatively various shapes of a structure unit can be formed thereby.

The exposure-development process of the present embodiment at least includes an exposure process and a development process, and includes processes for forming a final target, i.e., the section including the three-dimensional resin pattern (A) or the section including the three-dimensional resin pattern (B).

When it is considered that the element is used for an optical element such as an image sensor, it is preferable that the structure units of the resin pattern (A) 3 are periodically arranged in an array as shown in FIGS. 6 and 7B. Also, the structure units of the resin pattern (A) 3 are preferably arranged at a period shorter than or equal to 10 μm, or more preferably, shorter than or equal to 8 μm, and are preferably arranged at a period longer than or equal to 1 μm, or more preferably, longer than or equal to 1.5 μm.

A shape for the structure unit of the resin pattern (A) 3 is not particularly limited, and the shape may be appropriately determined according to an intended use of the element. When, for example, a photo mask having a circular pattern arranged in an array is used, the structure unit of the resin pattern (A) 3 has a cylindrical shape shown in FIG. 7B.

When it is considered that the element is used for an optical element such as an image sensor, it is preferable that the structure unit of the resin pattern (A) 3 has a lens shape, particularly, a convex lens shape. As shown in FIG. 7C, the section including the resin pattern (A) 3a having structure units of a convex lens shape can be formed by heat flow shaping for the resin pattern (A) 3 having structure units of the cylindrical shape shown in FIG. 7B.

The surface of the resin pattern (A) 3a is subjected to the exposure-development process so as to form the section including the resin pattern (B) 5 having microscopic structure units of the predetermined shape shown in FIG. 7D. The microscopic structure units are arranged at a period shorter than or equal to a wavelength range of a using light and, when it is considered that the element is used for an optical element such as an image sensor, are preferably periodically arranged in an array. From a viewpoint that the section including the resin pattern (A) 3a provides an excellent effect of preventing reflection-scattering, the microscopic structure units are preferably concavo-convex structure units periodically arranged in an array.

In the present embodiment, the effect of preventing reflection-scattering includes not only an effect of completely preventing reflection-scattering of a using light which is to be prevented from reflecting or scattering, but also an effect of preventing reflection-scattering of the using light.

In the exposure-development process, conditions for an exposure process or a development process may be appropriately changed according to an aim, i.e., the microscopic structure units of the resin pattern (B) 5 to have a predetermined shape. As the exposure process in the exposure-development process, the two-beam interference exposure process is, for example, preferably employed since a fine pattern can thereby be simultaneously formed over a wide area and thus, workability is enhanced when the section including the resin pattern (B) 5 having quite small microscopic structure units is formed on the surface of the section including the resin pattern (A) 3a. As in the case of the first embodiment, the two-beam interference exposure device shown in FIG. 9 can be used for the two-beam interference exposure process, for example.

In the two-beam interference exposure device 200, the element body 1a (indicated by a numeral 114 in FIG. 9) on which the section including the resin pattern (A) 3*a* is formed is set at a position where two luminous fluxes (two parallel luminous fluxes 111 and 113) are combined. Then, the KrF excimer laser 101 is caused to emit the laser beam 102 so as to expose the element body 1*a* (114). A development process or the like is appropriately performed, so as to form on the surface of the section including the resin pattern (A) 3*a* the section including the resin pattern (B) 5 having microscopic structure units, of the predetermined shape, arranged at a period shorter than or equal to the wavelength range of the using light, as shown in FIG. 7D.

In the two-beam interference exposure process, it is possible that, for example, the element body 1*a* (114) on which the section including the resin pattern (A) 3*a* is formed is rotated by 90 degrees so as to be exposed a plurality of times, e.g., twice, respectively, whereby the shape of the microscopic structure unit of the resin pattern (B) 5 can be appropriately changed.

In the two-beam interference exposure device 200 shown in FIG. 9, for example, the element body 1*a* (114) on which the section including the resin pattern (A) 3*a* is formed can be shifted in a perpendicular direction (up/down direction indicated by an arrow in FIG. 9). By adjusting the position of the element body 1*a* (114) along the perpendicular direction, the period ("p" in FIGS. 3 and 4 described above) for the microscopic structure units which are concavo-convex structure units and the height ("h" in FIGS. 3 and 4 described above) of a convex portion of the concavo-convex structure unit can be arbitrarily set.

Other than the two-beam interference exposure process, a mask exposure process can be performed as the exposure process in the exposure-development process, for example.

In the mask exposure process, a photo mask of a desired pattern may be formed on the surface of the section including the resin pattern (A) 3*a* for exposure, for example. Conditions for the mask exposure process may be appropriately changed such that the microscopic structure unit of the resin pattern (B) 5 has the predetermined shape, and desired period and height. After the mask exposure process, a development process or the like is appropriately performed so as to form on the surface of the section including the resin pattern (A) 3*a* the section including the resin pattern (B) 5 having microscopic structure units of the predetermined shape shown in FIGS. 6 and 7D.

Similarly to the microscopic structure unit of the resin pattern (B) in the first embodiment, as the microscopic structure unit of the resin pattern (B), a structure unit of a cone shape, a structure unit of a hexagonal pyramid shape, a structure unit of a pyramid shape such as a square pyramid shape, a structure unit of a pillar shape such as a cylindrical shape or a prismatic shape, a structure unit of a bell shape having a rounded tip, a structure unit of a frustum shape such as a truncated cone shape or a truncated pyramid shape and the like are exemplified. Each structure unit may not be of a strict geometric shape.

In the present embodiment, similarly to the microscopic structure unit of the resin pattern (B) of the first embodiment, not only the section including the resin pattern (B) having microscopic structure units of a protruding shape, but also a section including the resin pattern (B) having microscopic structure units of a recessed shape taking a subulate shape, a pillar shape, a bell shape or a frustum shape may be formed on the surface of the section including the resin pattern (A). A microscopic structure unit of a protruding shape and a microscopic structure unit of a recessed shape may coexist in one resin pattern (B). When using the resin pattern (B) in which a microscopic structure unit of a protruding shape and a microscopic structure unit of a recessed shape coexist, a sum of the height of the protruding portion and the depth of the recessed portion is a height (h) of a convex portion of a concavo-convex structure unit described later. As such, in the present embodiment, the shape of the microscopic structure unit is not particularly limited as long as the resin pattern (B) has microscopic structure units arranged at a period shorter than or equal to a wavelength range of a using light and an effect of preventing reflection-scattering is sufficiently provided.

When the microscopic structure units of the resin pattern (B) are concavo-convex structure units periodically arranged in an array, it is preferable that a relationship between a wavelength ($\lambda$) of a using light, a period (p) for the concavo-convex structure units and a height (h) of a convex portion of the concavo-convex structure unit satisfies the following expressions (a) and (b)

$$0.1\lambda < p < 0.8\lambda \tag{a}$$

$$0.5\lambda < h < 5\lambda \tag{b}.$$

When the relationship between the wavelength ($\lambda$), the period (p) and the height (h) satisfies the above expressions (a) and (b), a reflectance of the using light can be suppressed to smaller than or equal to about 1% in, particularly, an entire wavelength range of visible ray and in a range of 0 to 50 degrees for an incident angle of the using light. It is further preferable that the relationship between the wavelength ($\lambda$), the period (p) and the height (h) satisfies the following expressions (a1) and (b1):

$$0.15\lambda < p < 0.75\lambda \tag{a1}$$

$$0.6\lambda < h < 4\lambda \tag{b1}.$$

The structure unit of the resin pattern (A) 3*a* shown in FIGS. 6 and 7D is, for example, a structure unit of a planoconvex lens shape whose bottom is a flat circular face having a diameter of about 3.5 µm and top is a sphere having a radius of curvature of about 7 µm. The microscopic structure unit of the resin pattern (B) 5 is a concavo-convex structure unit which has a cone shape, as shown in FIG. 3, having a period of about 0.25 µm (period shorter than or equal to a wavelength range of 420 to 680 nm of visible ray) and a height of about 0.8 µm, and is directed in a perpendicular direction with respect to a surface of the substrate of the element body 1*a*. In the element 11 shown in FIGS. 6 and 7D, the section including the resin pattern (B) 5 in which the microscopic structure units of the cone shape shown in FIG. 3 are periodically arranged in an array is formed on the surface of the section including the resin pattern (A) 3*a* in which the structure units of the planoconvex lens shape are periodically arranged in an array. By forming the section including the resin pattern (B) 5 having such microscopic structure units on the surface of the section including the resin pattern (A) 3*a*, an excellent effect of preventing reflection-scattering can be provided to the section including the resin pattern (A) 3*a*.

In the present embodiment, when the resin pattern (B) has a large number of microscopic structure units two-dimensionally arranged, the period therefor refers to a period in a direction of the closest arrangement.

Accordingly, it is easy to produce the element 11 in which the section including the resin pattern (B) 5 having microscopic structure units, of the predetermined shape, arranged at the period shorter than or equal to the wavelength range of the using light is formed on the surface of the section including the resin pattern (A) 3*a* having structure units, of the predetermined shape, on the element body 1*a*.

The element of the present embodiment is not limited to the element 11 having a configuration shown in FIG. 6. Any element may be used if an element body, a section including the resin pattern (A) and a section including the resin pattern (B) described above are included.

The element of the present embodiment is suitably used as an optical element such as an image sensor, e.g., a CCD or a C-MOS, or a liquid crystal device, that includes a micro lens. Alternatively, the element of the present embodiment is suitably used as, for example, a micro electro mechanical element such as a two-dimensional optical switch, an IR sensor, a membrane sensor, a microgripper or a microknife.

In the present embodiment, an optical element includes all parts, e.g., a lens element, a prism element and a mirror element, arranged in an optical path and having an optical function surface.

Fourth Embodiment

An optical element of a fourth embodiment comprises: an optical element body including a substrate; a lens section formed on the optical element body and including the resin pattern (A) having structure units, of a convex lens shape, periodically arranged in an array such that positions thereof correspond to photo-electric conversion elements of the optical element body; and a reflection-scattering prevention section formed on a surface of the lens section and including the resin pattern (B) having microscopic concavo-convex structure units, of a predetermined shape, periodically arranged in an array such that a period thereof is shorter than or equal to a wavelength range of a using light.

In the present embodiment, the wavelength range of the using light corresponds to a wavelength range of a light under an environment where the optical element is used. That is, the wavelength range of the using light is a wavelength range of a transmitted light (incident light), e.g., a visible ray, entering onto the lens section. Also, included is a wavelength range of a light, e.g., an ultraviolet ray, under an environment where the optical element is produced.

Figure 8:
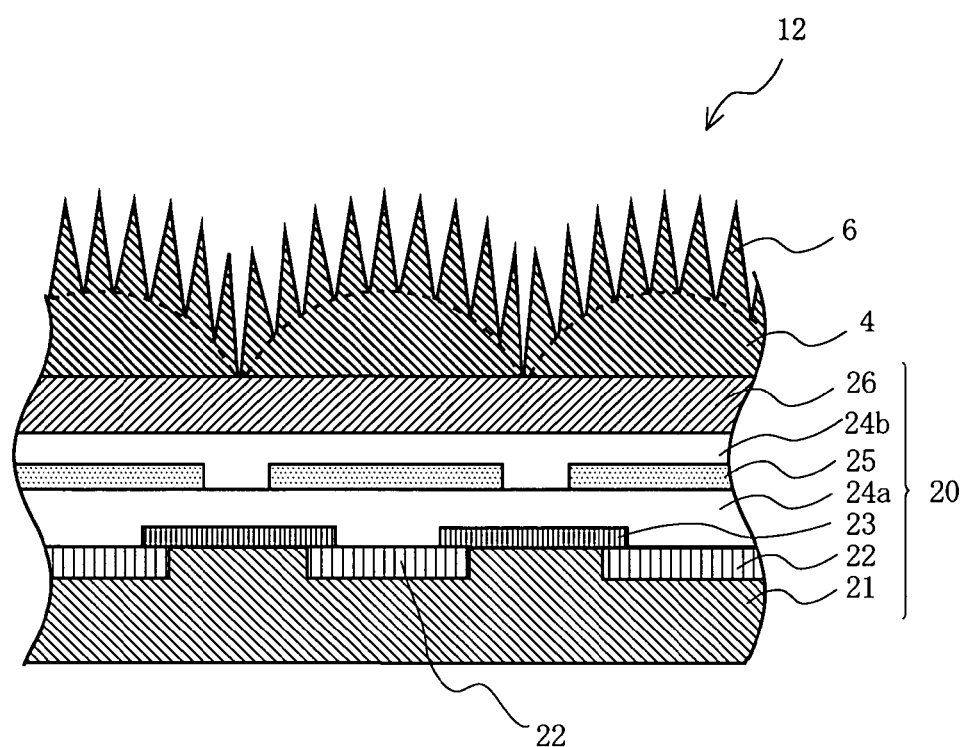
FIG. 8 is a cross sectional illustration schematically showing an example of an optical element according to a fourth embodiment of the present invention.

FIG. 8 shows a cross sectional illustration schematically showing an example of the optical element according to the fourth embodiment of the present invention. In an optical element 12 shown in FIG. 8, an optical element body 20 is configured as follows. That is, on a substrate 21, a plurality of photo-electric conversion elements 22 are formed in an array, and a light-shielding section 23 is provided between the adjacent photo-electric conversion elements 22. A planarized layer 24a is formed on the substrate 21 so as to cover the photo-electric conversion elements 22 and the light-shielding sections 23. On the planarized layer 24a, a plurality of color filters 25 are formed in an array such that positions thereof correspond to the photo-electric conversion elements 22. A planarized layer 24b is formed on the planarized layer 24a so as to cover the color filters 25. An undercoat layer 26 is formed on the planarized layer 24b. As such, the optical element body 20 includes the substrate 21, the photo-electric conversion elements 22, the light-shielding sections 23, the planarized layer 24a, the color filters 25, the planarized layer 24b and the undercoat layer 26.

On the optical element body 20 formed is a lens section including a resin pattern (A) 4 having structure units, of a convex lens shape, periodically arranged in an array such that positions thereof correspond to the photo-electric conversion elements 22. On the surface of the lens section formed is a reflection-scattering prevention section including a resin pattern (B) 6 having microscopic concavo-convex structure units, of a predetermined shape, periodically arranged in an array such that a period thereof is shorter than or equal to a wavelength range of a using light.

In order to produce the optical element 12 of the fourth embodiment shown in FIG. 8, the photo-electric conversion elements 22, the light-shielding sections 23, the planarized layer 24a, the color filters 25, the planarized layer 24b and the undercoat layer 26 are sequentially formed on the substrate 21 such as a semiconductor substrate, e.g., a Si-substrate or a SiC-substrate, by a common method for producing the optical element body 20. A resin layer is formed on the optical element body 20, the resin layer is subjected to an exposure-development process, and the resin pattern (A) having structure units of, e.g., a cylindrical shape, is formed such that the structure units thereof are periodically arranged in an array at positions corresponding to the photo-electric conversion elements 22 of the optical element body 20. Then, the lens section including the resin pattern (A) 4 having structure units of the convex lens shape is formed by heat flow shaping for the resin pattern (A) having structure units of the cylindrical shape, for example. The resin pattern (A) 4 of the optical element 12 of the fourth embodiment can be produced in a similar manner to that of the third embodiment except that the structure units are periodically arranged in an array such that positions thereof correspond to the photo-electric conversion elements 22 of the optical element body 20.

That is, the optical element body 20 is coated with a resin solution by a spin coat method or the like, and is dried so as to form a resin layer. As the resin for the resin layer, an ultraviolet photoresist or the like which is a photosensitive resin is suitably used. When the photosensitive resin is used, it becomes possible to easily form the reflection-scattering prevention section including a resin pattern (B) 6 having microscopic concavo-convex structure units by using, for example, a two-beam interference exposure process described later. It is preferable that the resin for the resin layer is excellent in light transitivity. In forming the resin layer, a surface active agent may be added to the resin solution, two or more kinds of solvents may be mixed with the resin solution, a molecular weight or a molecular weight distribution of the resin may be adjusted, or two or more kinds of resins may be mixed with each other.

The resin layer is subjected to an exposure-development process so as to form the resin pattern (A) having structure units of the predetermined shape.

In the exposure-development process, conditions for an exposure process or a development process may be appropriately changed according to an aim, i.e., the structure units of the resin pattern (A) to have a predetermined shape. The exposure process for the exposure-development process can be, for example, a mask exposure process in which a photo mask having a desired pattern is formed for exposure, or a two-beam interference exposure process which is used in a two-beam interference exposure device shown in FIG. 9 and is suitable for forming the resin pattern (B) 6 described later. In forming the resin pattern (A), the mask exposure process is preferably employed because a structure unit of the resin pattern (A) is not as quite small as a microscopic concavo-convex structure unit of the resin pattern (B) 6 and relatively various shapes of a structure unit can be formed thereby.

The exposure-development process of the present embodiment at least includes an exposure process and a development process, and includes processes for forming a final target, i.e., the lens section including the three-dimensional resin pattern (A) or the reflection-scattering prevention section including the three-dimensional resin pattern (B).

When an intended use for an obtained optical element is considered, it is preferable that the structure units of the resin pattern (A) are arranged at a period shorter than or equal to 10 µm, or more preferably, shorter than or equal to 8 µm, and are preferably arranged at a period longer than or equal to 1 µm, or more preferably, longer than or equal to 1.5 µm.

By heat flow shaping for the resin pattern (A) having structure units of a cylindrical shape, the lens section including the resin pattern (A) 4 having structure units of a convex lens shape is formed, for example. The structure units of the convex lens shape in the lens section are periodically arranged in an array such that positions thereof correspond to the photoelectric conversion elements and hence operate as, for example, micro lenses in an image sensor.

The surface of the lens section is subjected to the exposure-development process so as to form the reflection-scattering prevention section including the resin pattern (B) 6 having microscopic concavo-convex structure units, of the predetermined shape, periodically arranged in an array such that the period thereof is shorter than or equal to the wavelength range of the using light. Such a reflection-scattering prevention section including the resin pattern (B) 6 having specific microscopic concavo-convex structure units can provide an excellent effect of preventing reflection-scattering to the lens section including the resin pattern (A) 4.

In the present embodiment, the effect of preventing reflection-scattering includes not only an effect of completely preventing reflection-scattering of a using light which is to be prevented from reflecting or scattering, but also an effect of preventing reflection-scattering of the using light.

In the exposure-development process, conditions for an exposure process or a development process may be appropriately changed according to an aim, i.e., the microscopic concavo-convex structure units of the resin pattern (B) 6 to have a predetermined shape. As the exposure process in the exposure-development process, the two-beam interference exposure process is, for example, preferably employed since a fine pattern can thereby be simultaneously formed over a wide area and thus, workability is enhanced when the reflection-scattering prevention section including the resin pattern (B) 6 having quite small microscopic concavo-convex structure units is formed on the surface of the lens section including the resin pattern (A) 4. As in the case of the first and third embodiments, the two-beam interference exposure device shown in FIG. 9 can be used for the two-beam interference exposure process, for example.

In the two-beam interference exposure device 200, the optical element body (indicated by a substrate 114 in FIG. 9) on which the lens section is formed is set at a position where two luminous fluxes (two parallel luminous fluxes 111 and 113) are combined. Then, the KrF excimer laser 101 is caused to emit the laser beam 102 so as to expose the optical element body (substrate 114). A development process or the like is appropriately performed so as to form the reflection-scattering prevention section on the surface of the lens section.

In the two-beam interference exposure process, it is possible that, for example, the optical element body (substrate 114) on which the lens section is formed is rotated by 90 degrees so as to be exposed a plurality of times, e.g., twice, respectively, whereby the shape of the concavo-convex microscopic structure unit of the resin pattern (B) can be appropriately changed.

In the two-beam interference exposure device 200 shown in FIG. 9, for example, the optical element body (substrate 114) on which the lens section is formed can be shifted in a perpendicular direction (up/down direction indicated by an arrow in FIG. 9). By adjusting the position of the optical element body (substrate 114) along the perpendicular direction, the period ("p" in FIGS. 3 and 4 described above) for the microscopic concavo-convex structure units and the height ("h" in FIGS. 3 and 4 described above) of a convex portion of the microscopic concavo-convex structure unit can be arbitrarily set.

Other than the two-beam interference exposure process, a mask exposure process can be performed as the exposure process in the exposure-development process, for example.

In the mask exposure process, a photo mask of a desired pattern may be formed on the surface of the lens section for exposure, for example. Conditions for the mask exposure process may be appropriately changed such that the microscopic concavo-convex structure unit of the resin pattern (B) has the predetermined shape, and desired period and height. After the mask exposure process, a development process or the like is appropriately performed so as to form on the surface of the lens section the reflection-scattering prevention section including the resin pattern (B) having microscopic concavo-convex structure units of the predetermined shape.

Similarly to the microscopic structure unit of the resin pattern (B) in the first and third embodiments, as the microscopic concavo-convex structure unit of the resin pattern (B), a structure unit of a cone shape, a structure unit of a hexagonal pyramid shape, a structure unit of a pyramid shape such as a square pyramid shape, a structure unit of a pillar shape such as a cylindrical shape or a prismatic shape, a structure unit of a bell shape having a rounded tip, a structure unit of a frustum shape such as a truncated cone shape or a truncated pyramid shape and the like are exemplified. Each structure unit may not be of a strict geometric shape.

In the present embodiment, similarly to the microscopic structure unit of the resin pattern (B) of the first and third embodiments, not only the reflection-scattering prevention section including the resin pattern (B) having microscopic concavo-convex structure units of a protruding shape, but also a reflection-scattering prevention section including the resin pattern (B) having microscopic concavo-convex structure units of a recessed shape taking a subulate shape, a pillar shape, a bell shape or a frustum shape may be formed on the surface of the lens section. A microscopic concavo-convex structure unit of a protruding shape and a microscopic concavo-convex structure unit of a recessed shape may coexist in one resin pattern (B). When using the resin pattern (B) in which a microscopic concavo-convex structure unit of a protruding shape and a microscopic concavo-convex structure unit of a recessed shape coexist, a sum of the height of the protruding portion and the depth of the recessed portion is a height (h) of a convex portion of a microscopic concavo-convex structure unit described later. As such, in the present embodiment, the shape of the microscopic concavo-convex structure unit is not particularly limited as long as the resin pattern (B) has microscopic concavo-convex structure units arranged at a period shorter than or equal to a wavelength range of a using light and an effect of preventing reflection-scattering is sufficiently provided.

For the resin pattern (B), it is preferable that a relationship between a wavelength (λ) of a using light, a period (p) for the microscopic concavo-convex structure units and a height (h) of a convex portion of the microscopic concavo-convex structure unit satisfies the following expressions (a) and (b):

$$0.1\lambda < p < 0.8\lambda \quad \text{(a)}$$

$$0.5\lambda < h < 5\lambda \quad \text{(b).}$$

When the relationship between the wavelength (λ), the period (p) and the height (h) satisfies the above expressions (a) and (b), a reflectance of the using light can be suppressed to smaller than or equal to about 1% in, particularly, an entire wavelength range of visible ray and in a range of 0 to 50 degrees for an incident angle of the using light. It is further preferable that the relationship between the wavelength (λ), the period (p) and the height (h) satisfies the following expressions (a1) and (b1):

$$0.15\lambda < p < 0.75\lambda \tag{a1}$$

$$0.6\lambda < h < 4\lambda \tag{b1}$$

In the present embodiment, when the resin pattern (B) has a large number of microscopic concavo-convex structure units two-dimensionally arranged, the period therefor refers to a period in a direction of the closest arrangement.

The structure unit of the resin pattern (A) 4 shown in FIG. 8 is, for example, a structure unit of a planoconvex lens shape whose bottom is a flat circular face having a diameter of about 3.5 μm and top is a sphere having a radius of curvature of about 7 μm. The microscopic concavo-convex structure unit of the resin pattern (B) 6 is a structure unit which has a cone shape, shown in FIG. 3, having a period of about 0.25 μm (period shorter than or equal to a wavelength range of 420 to 680 nm of visible ray) and a height of about 0.8 μm, and is directed in a perpendicular direction with respect to a surface of the substrate 21. In the optical element 12 shown in FIG. 8, the reflection-scattering prevention section including the resin pattern (B) 6 in which the microscopic concavo-convex structure units of the cone shape shown in FIG. 3 are periodically arranged in an array is formed on the surface of the lens section including the resin pattern (A) 4 in which the structure units of the planoconvex lens shape are periodically arranged in an array. By forming the reflection-scattering prevention section including the resin pattern (B) 6 having such microscopic concavo-convex structure units on the surface of the lens section including the resin pattern (A) 4, an excellent effect of preventing reflection-scattering can be provided to the lens section including the resin pattern (A) 4.

The lens section including the resin pattern (A) 4 having been provided with such an excellent effect of preventing reflection-scattering is extremely effective as a micro lens, and can not only enhance sensitivity of an optical element by increasing quantity of an incident light but also prevent increase of noise such as a flare or a ghost image caused by the incident light. It is also possible to reduce noise caused by a scattering light or a re-reflecting light due to a surface of the optical element 12 (surface of the lens section) and an inner face of a cover glass. Accordingly, the optical element 12 having the lens section provided with such a reflection-scattering prevention section is fully satisfactory for a level required for, for example, a high definition image sensor, with regard to high sensitivity and reduction of noise such as a flare or a ghost image caused by an unnecessary reflecting light or scattering light.

As such, it is easy to produce the optical element 12 in which the reflection-scattering prevention section including the resin pattern (B) 6 having microscopic concavo-convex structure units, of the predetermined shape, arranged at the period shorter than or equal to the wavelength range of the using light is formed on the surface of the lens section including the resin pattern (A) 4 having structure units of the convex lens shape on the optical element body 20 including the substrate 21.

The optical element of the present embodiment is not limited to the optical element 12 having a configuration shown in FIG. 8. Any optical element may be used if an optical element body, a lens section and a reflection-scattering prevention section described above are included.

The optical element of the present embodiment is suitably used as an optical element such as an image sensor, e.g., a CCD or a C-MOS, or a liquid crystal device, that includes a micro lens.

In the present embodiment, an optical element includes all parts, e.g., a lens element, a prism element and a mirror element, arranged in an optical path and having an optical function surface.

INDUSTRIAL APPLICABILITY

A structure, an element and an optical element of the present invention are suitably used in a device field requiring excellent optical functions such as high sensitivity and low noise, in particular. Also, with the methods of the present invention, productivity of such excellent structure, element and optical element can be remarkably enhanced.

The invention claimed is:

1. A method for producing a structure, the method comprising steps of:
   (i) forming a resin layer on a base material and subjecting the resin layer to a first exposure-development process so as to form a plurality of structure units of a predetermined shape, and performing a heat-flow-shaping process to the plurality of structure units so that each of the plurality of structure units becomes a converging lens having refractive power, thereby forming a resin pattern (A); and
   (ii) subjecting a surface of the resin pattern (A) to a second exposure-development process and forming a resin pattern (B) having microscopic structure units, of a predetermined shape, arranged at a period shorter than or equal to a wavelength range of a using light, wherein:
   the steps (i) and (ii) are sequential, and
   in the step (i), the plurality of structure units thereof are periodically arranged in an array.

2. The method as claimed in claim 1, wherein, in the step (i), the resin layer is formed from a photosensitive resin.

3. The method as claimed in claim 1, wherein, in the step (ii), the resin pattern (B) is formed such that the microscopic structure units thereof are concavo-convex structure units periodically arranged in an array.

4. The method as claimed in claim 3, wherein the resin pattern (B) is formed such that the microscopic structure units thereof are two-dimensionally periodically arranged in an array.

5. The method as claimed in claim 1, wherein, in the step (ii), an exposure process in the exposure-development process is a two-beam interference exposure process.

6. The method as claimed in claim 5, wherein the two-beam interference exposure process is a process for rotating the base material on which the resin pattern (A) is formed by 90 degrees so as to be exposed twice.

7. The method as claimed in claim 1, wherein, in the step (ii), an exposure process in the exposure-development process is a mask exposure process.

8. A structure-replicating mold produced, by electroforming, from the structure produced by the method as claimed in claim 1.

9. A method for producing a structure, comprising molding by using the structure-replicating mold as claimed in claim 8.

10. The method of claim 1, wherein in the step (i), the plurality of structure units are made of the resin layer remaining on the base material after the first exposure-development process.

11. A method for producing an element, the method comprising steps of:
(I) forming a resin layer on an element body including a substrate and subjecting the resin layer to a first exposure-development process so as to form a section including a plurality of structure units of a predetermined shape, and performing a heat-flow-shaping process to the plurality of structure units so that each of the plurality of structure units becomes a converging lens having refractive power, thereby forming a resin pattern (A); and
(II) subjecting a surface of the section including the resin pattern (A) to a second exposure-development process and forming a section including a resin pattern (B) having microscopic structure units, of a predetermined shape, arranged at a period shorter than or equal to a wavelength range of a using light, wherein:
the steps (I) and (II) are sequential,
in the step (I), the plurality of structure units are periodically arranged in an array.

12. The method as claimed in claim 11, wherein, in the step (I), the resin layer is formed from a photosensitive resin.

13. The method as claimed in claim 11, wherein, in the step (II), the resin pattern (B) is formed such that the microscopic structure units thereof are concavo-convex structure units periodically arranged in an array.

14. The method as claimed in claim 13, wherein the resin pattern (B) is formed such that the microscopic structure units thereof are two-dimensionally periodically arranged in an array.

15. The method as claimed in claim 11, wherein, in the step (II), an exposure process in the exposure-development process is a two-beam interference exposure process.

16. The method as claimed in claim 15, wherein the two-beam interference exposure process is a process for rotating the element body on which the section including the resin pattern (A) is formed by 90 degrees so as to be exposed twice.

17. The method as claimed in claim 11, wherein, in the step (II), an exposure process in the exposure-development process is a mask exposure process.

18. The method of claim 11, wherein in the step (I), the plurality of structure units are made of the resin layer remaining on the element body after the first exposure-development process.

19. A method for producing an optical element, the method comprising steps of:
(1) forming a resin layer on an optical element body including a substrate, subjecting the resin layer to a first exposure-development process so as to form a plurality of structure units periodically arranged in an array such that each of the plurality of structure units positions over a corresponding one of photo-electric conversion elements formed in an array in the optical element body, and then forming a lens section by applying a heat-flow-shaping process to the plurality of structure units so that each of the plurality of structure units becomes a converging lens having refractive power; and
(2) subjecting a surface of the lens section to a second exposure-development process and forming a reflection-scattering prevention section including a resin pattern having microscopic concavo-convex structure units, of a predetermined shape, periodically arranged in an array such that a period thereof is shorter than or equal to a wavelength range of a using light, wherein:
the steps (1) and (2) are sequential.

20. The method as claimed in claim 19, wherein, in the step (1), the resin layer is formed from with a photosensitive resin.

21. The method as claimed in claim 19, wherein, in the step (2), an exposure process in the exposure-development process is a two-beam interference exposure process.

22. The method as claimed in claim 21, wherein the two-beam interference exposure process is a process for rotating the optical element body on which the lens section is formed by 90 degrees so as to be exposed for twice.

23. The method as claimed in claim 19, wherein, in the step (2), an exposure process in the exposure-development process is a mask exposure process.

24. The method as claimed in claim 19, wherein the resin pattern (B) is formed such that the microscopic concavo-convex structure units thereof are two-dimensionally periodically arranged in an array.

25. The method of claim 19, wherein in the step (1), the plurality of structure units are made of the resin layer remaining on the optical element body after the first exposure-development process.

26. A method for producing a structure, the method comprising steps of:
forming a resin layer on a base material and subjecting the resin layer to a first exposure-development process so as to form structure units of a predetermined shape, and performing a heat-flow-shaping process to the structure units so that each of the structure units becomes a converging lens having refractive power, thereby forming a resin pattern (A); and
(ii) subjecting a surface of the resin pattern (A) to a second exposure-development process and forming a resin pattern (B) having microscopic structure units, of a predetermined shape, arranged at a period shorter than or equal to a wavelength range of a using light, wherein:
the steps (i) and (ii) are sequential, and
in the step (i), the structure units are formed so as to be arranged at a period shorter than or equal to 10 µm and longer than or equal to 1 µm.

27. A structure-replicating mold produced, by electroforming, from the structure produced by the method as claimed in claim 26.

28. A method for producing a structure, comprising molding by using the structure-replicating mold as claimed in claim 27.

29. The method of claim 26, wherein in the step (i), the structure units are made of the resin layer remaining on the base material after the first exposure-development process.

30. A method for producing an element, the method comprising steps of:
(I) forming a resin layer on an element body including a substrate and subjecting the resin layer to a first exposure-development process so as to form a section including structure units of a predetermined shape, and performing a heat-flow-shaping process to the structure units so that each of the structure units becomes a converging lens having refractive power, thereby forming a resin pattern (A); and
(II) subjecting a surface of the resin pattern (A) to a second exposure-development process and forming a section including a resin pattern (B) having microscopic structure units, of a predetermined shape, arranged at a period shorter than or equal to a wavelength range of a using light, wherein:
the steps (I) and (II) are sequential, and
in the step (I), the structure units are formed so as to be arranged at a period shorter than or equal to 10 µm and longer than or equal to 1 µm.

31. The method of claim 30, wherein in the step (I), the structure units are made of the resin layer remaining on the element body after the first exposure-development process.

32. A method for producing an optical element, the method comprising steps of:
(1) forming a resin layer on an optical element body including a substrate, subjecting the resin layer to a first exposure-development process so as to form structure units periodically arranged in an array such that each of the structure unit positions over a corresponding one of photo-electric conversion elements formed in an array in the optical element body, and then forming a lens section by applying a heat-flow-shaping process to the structure units such that each of the structure units becomes a converging lens having refractive power; and
(2) subjecting a surface of the lens section to a second exposure-development process and forming a reflection-scattering prevention section including a resin pattern having microscopic concave-convex structure units, of a predetermined shape, periodically arranged in an array such that a period thereof is shorter than or equal to a wavelength range of a using light, wherein:
the steps (1) and (2) are sequential, and
in the step (1), the structure units are formed to be arranged at a period shorter than or equal to 10 μm and longer than or equal to 1 μm.

33. The method of claim 32, wherein in the step (1), the structure units are made of the resin layer remaining on the optical element body after the first exposure-development process.

* * * * *